United States Patent
Jung et al.

(10) Patent No.: US 9,072,008 B2
(45) Date of Patent: Jun. 30, 2015

(54) METHOD AND APPARATUS FOR CONTROLLING THE POWER OF TERMINAL IN A MOBILE COMMUNICATION SYSTEM COMPRISING A FEMTOCELL AND A MACRO BASE STATION

(75) Inventors: Jung Soo Jung, Seongnam-si (KR); Soeng Hun Kim, Suwon-si (KR); Kyeong In Jeong, Hwaseong-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 146 days.

(21) Appl. No.: 13/146,125
(22) PCT Filed: Jan. 11, 2010
(86) PCT No.: PCT/KR2010/000142
§ 371 (c)(1), (2), (4) Date: Nov. 10, 2011
(87) PCT Pub. No.: WO2010/085055
PCT Pub. Date: Jul. 29, 2010

(65) Prior Publication Data
US 2012/0064907 A1 Mar. 15, 2012

(30) Foreign Application Priority Data
Jan. 23, 2009 (KR) .................. 10-2009-0005771

(51) Int. Cl.
*H04W 72/00* (2009.01)
*H04W 28/26* (2009.01)
(Continued)

(52) U.S. Cl.
CPC ............ *H04W 28/26* (2013.01); *H04W 52/146* (2013.01); *H04W 52/244* (2013.01);
(Continued)

(58) Field of Classification Search
CPC ..... H04W 72/12; H04W 72/00; H04W 72/04; H04W 52/02; H04W 84/045; H04W 52/244; H04W 28/26; H04W 52/146; H04W 52/343; H04W 72/0493; H04W 16/32; H04W 72/0446; H04W 72/0426; H04W 72/0473; H04W 72/082; H04W 52/367; H04W 52/38; H04W 52/40

USPC .............. 370/310.2, 322, 328, 329, 330, 338, 370/341, 343, 345, 348; 455/424, 425, 444, 455/452.1, 452.2, 464
See application file for complete search history.

(56) References Cited

U.S. PATENT DOCUMENTS

| 2005/0094602 A1 | 5/2005 | Gollamudi et al. |
| 2006/0098655 A1* | 5/2006 | Zeira et al. .................... 370/389 |

(Continued)

FOREIGN PATENT DOCUMENTS

| KR | 10-2001-0028707 A | 4/2001 |
| KR | 10-2008-0085770 A | 9/2008 |
| WO | 2008-054157 A2 | 5/2008 |

OTHER PUBLICATIONS

Qualcomm Europe, Carrier Aggregation in Heterogeneous Networks, 3GPP TSG RAN WG1 #55bis, R1-090357, Jan. 8, 2009, p. 1-p. 9; figure 2, Sophia-Antipolis, France.
(Continued)

*Primary Examiner* — Dinh P Nguyen
(74) *Attorney, Agent, or Firm* — Jefferson IP Law, LLP

(57) ABSTRACT

The present invention relates to a method for allocating a radio resource of a base station for controlling the power of a terminal in a mobile communication system including a plurality of femtocells in the service coverage of a macro base station, said method comprising: a radio resource-grouping step of dividing the radio resources shared by the macro base station and the femtocells into groups in accordance with a preset criterion; a radio resource-allocating step of randomly allocating each of the grouped radio resources to base stations such that the terminal uses maximum transmitting power in different resource areas for the plurality of base stations; and a transmitting step of transmitting the allocated radio resource information to the terminal. The method of the present invention effectively controls interferences between the terminal in communication with the macro base station and the terminal in communication with the femtocell.

9 Claims, 11 Drawing Sheets

(51) Int. Cl.
*H04W 52/24* (2009.01)
*H04W 52/34* (2009.01)
*H04W 52/36* (2009.01)
*H04W 72/08* (2009.01)
*H04W 52/14* (2009.01)
*H04W 72/04* (2009.01)
*H04W 84/04* (2009.01)
*H04W 16/32* (2009.01)
*H04W 52/38* (2009.01)
*H04W 52/40* (2009.01)

(52) U.S. Cl.
CPC ............ *H04W52/343* (2013.01); *H04W 72/04* (2013.01); *Y02B 60/50* (2013.01); *H04W 52/367* (2013.01); *H04W 72/0426* (2013.01); *H04W 72/0446* (2013.01); *H04W 72/0473* (2013.01); *H04W 72/0493* (2013.01); *H04W 72/082* (2013.01); *H04W 84/045* (2013.01); *H04W 16/32* (2013.01); *H04W 52/38* (2013.01); *H04W 52/40* (2013.01)

(56) References Cited

U.S. PATENT DOCUMENTS

2007/0097894 A1*  5/2007  Prakash ................... 370/311
2008/0062936 A1*  3/2008  He et al. ................. 370/338
2009/0086861 A1*  4/2009  Yavuz et al. ............. 375/346

OTHER PUBLICATIONS

Qualcomm Europe, Range expansion for efficient support of heterogeneous networks, 3GPP TSG-RAN WG1 #54bis, R1-083813, Sep. 24, 2008, p. 1-p. 3, Sophia-Antipolis, France.

* cited by examiner

Femto Cell B

METHOD AND APPARATUS FOR CONTROLLING THE POWER OF TERMINAL IN A MOBILE COMMUNICATION SYSTEM COMPRISING A FEMTOCELL AND A MACRO BASE STATION

BACKGROUND OF THE INVENTION

1. Field of the Invention

The present invention relates to a power control method and apparatus of a terminal in a wireless communication system including femto and macro base stations. In more detail, the present invention relates to a power control method and apparatus of a terminal for grouping the radio resource shared by femto and macro base station in predetermined segmentation unit and assigning priority to use maximum transmit power.

2. Description of the Related Art

Recently, the boundary between fixed and mobile services has increasingly become blurred due to the advance of communication technologies. For example, the fixed service providers are investing in the Internet Protocol telephony represented by Voice over Internet Protocol (VoIP) as part of broadband Internet access service based on the Wireless Local Area Network (WLAN) connection to compete against the wireless voice and data service provided by the wireless service providers, under the objective of fixed-mobile convergence (FMC). In contrast, the wireless service providers are driving Fixed Mobile Substitution (FMS) with the introduction of home network service such as homezone service to provide the user with fixed voice service in indoor environment. In such omnidirectional competition, a small cellular base station called "femto-cell" designed for use in a home or small business is introduced as an alternative way of the wireless service providers to deliver the benefits of the FMC.

Since the femto base station uses the same radio access technology as the cellular network having the nationwide service coverage, the user can enjoy the benefits of service coverage expansion (reduction of shadow area) without purchase of an additional handset, high speed data service, and cheap billing rate of public network use.

Meanwhile, the femto base station providing the service using the same technology and frequency band as the cellular network causes various problems. One of the representative examples is the interference with the macro base station and other femto base stations.

There is therefore a need to guarantee the service reception performance of the terminal in the area where the macro and femto base stations coexist.

SUMMARY OF THE INVENTION

Problem to be Solved

The present invention is conceived to solve this problem, and it is an object to provide a method for managing the resource in which the different types of base stations are interfering with each other, efficiently.

For this purpose, the present invention divides the radio resource shared by the macro and femto base station and classifies the divided resources into groups. One of the groups is assigned a macro base station-preferred priority, and the other is assigned a femto base station-preferred priority.

Means for Solving the Problem

In order to solve the above problems, a radio resource allocation method of a base station for controlling power of a terminal in a mobile communication system including a plurality of femto base stations in a service coverage of a macro base station according to the present invention includes dividing the radio resource shared by the macro and femto base stations into groups according to a predetermined rule, allocating the radio resource to each base station with the priority for use of maximum transmit power in specific radio resource group, and transmitting information on the allocated radio resource to the terminal.

Also, a power control method of a terminal in a mobile communication system including a plurality of femto base station in a service coverage of a macro base station according to the present invention includes receiving inform on radio resources allocated to use with maximum transmit power from one of the macro and femto base stations; transmitting at the maximum transmit power to the base station in communication with the terminal in a radio resource region configured to use the maximum transmit power; and transmitting at a transmit power below the maximum transmit power to the base station in communication with the terminal in a radio resource region excepted for the radio resource region configured to use the maximum transmit power.

Also, a base station allocating radio resource for power control of a terminal in a mobile communication system including a plurality of femto base station in a service coverage of a macro base station according to the present invention includes a scheduler which performs scheduling by dividing the radio resource shared by the macro and femto base stations into groups according to a predetermined rule and allocating the radio resource to each base station with the priority for use of maximum transmit power in specific radio resource group and a radio communication unit which transmits information on the allocated radio resource to the terminal.

Furthermore, a power control apparatus for controlling transmit power on radio resource for transmission to a base station in a mobile communication system including a plurality of femto base stations in a service coverage of a macro base station according to the present invention includes an RF communication unit which transmits subframes to the base station by adjusting transmit power level, a priority determiner which determines a radio resource group corresponding to a subframe using an number of the subframe to be transmitted to the base station and determines whether the radio resource group is the group in which the base stations is assigned usage priority of maximum transit power; and a power control unit which controls the RF communication unit to set the transmit power to the maximum transmit power for the radio resource group in which the base station is assigned usage priority of maximum transit power and to a restricted transmit power, below the maximum transmit power, for the radio resource group in which the base station is not assigned the usage priority of the maximum transmit power.

Advantageous Effects

In the present invention, the radio resource shared by the base stations is divided into groups in time or frequency domain that are used at different transmit powers so as to control the interferences between the terminal communicating with a macro cell and the terminal communication with a femto cell efficiently.

DETAILED DESCRIPTION OF EXEMPLARY EMBODIMENTS

In the following, the micro base station means the indoor base station such as the pico cell base station or the femto cell base station that can be installed in a building or home and the description is made under the assumption that the micro base station is the femto cell. However, it is not necessary to limit the micro base station appeared in the present invention to the femto cell base station.

Although the description is directed to a mobile communication based on CDMA HRPD (Code Division Multiple Access High Rate Packet Data), i.e., 1×EVDO (1× Evolution-Data Only), the technical configuration of the present invention is not limited thereto. Since the reverse radio resource is divided into subframes in time domain, the terms radio resource and subframes can be interchangeably used with each other in the following description.

The power control method of the present invention is described with the first and second embodiments discriminated based on the resource grouping scheme.

In this case, the first embodiment describes a method for controlling power by dividing the reverse radio resource shared by the base stations into groups in unit of interlace. And, the second embodiment describes a method for controlling power by dividing the reverse radio resource shared by the base stations into groups in unit of interface and regrouping the groups into multiplex as plural time units.

Exemplary embodiments of the present invention are described with reference to the accompanying drawings in detail. The same reference numbers are used throughout the drawings to refer to the same or like parts. Detailed description of well-known functions and structures incorporated herein may be omitted to avoid obscuring the subject matter of the present invention.

Figure 1:
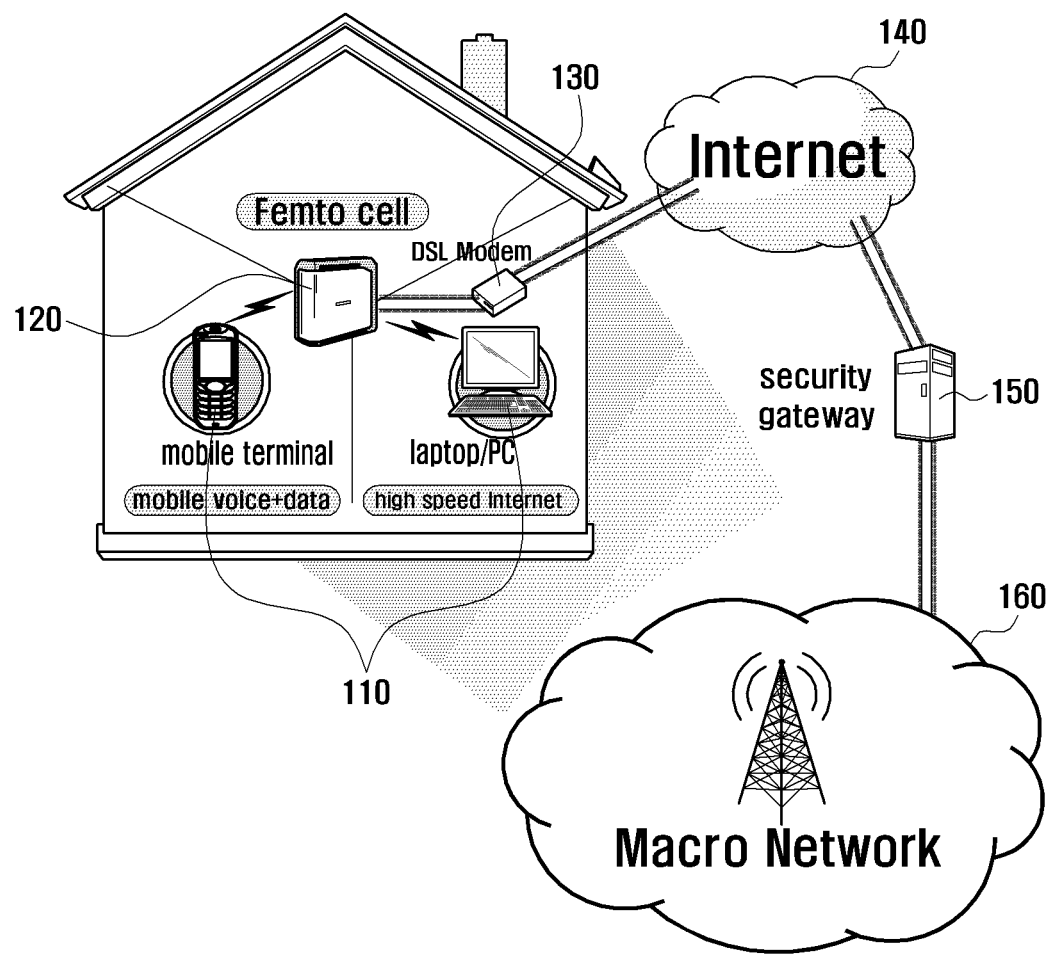
FIG. 1 is a diagram illustrating a configuration of a typical femto cell system.

FIG. 1 is a diagram illustrating a configuration of a mobile communication system including a typical femto cell base station. The femto cell system includes a terminal 110, a femto cell base station 120, a modem 130, the Internet 140, a gateway 150, and a macro network 160.

The terminal 110 connects to the femto cell base station 120 via radio access. The terminal 110 can be any of a portable terminal such as Personal Digital Assistant (PDA) and Smart Phone, Personal Computer (PC), and laptop computer, as well as mobile communication terminal.

The femto cell base station 120 means a micro base station for use in indoor environment such as home and office, and it is assumed to be installed at any place where the user want. The femto cell base station 20 connects to the Internet 140 through the modem 130 installed at an indoor place and then to the macro network 160 via the gateway 150. That is, the femto cell base station 120 connects to the core network (macro network in drawing) via the Internet so as to provide the terminal 110 with the mobile communication service.

Figure 2:
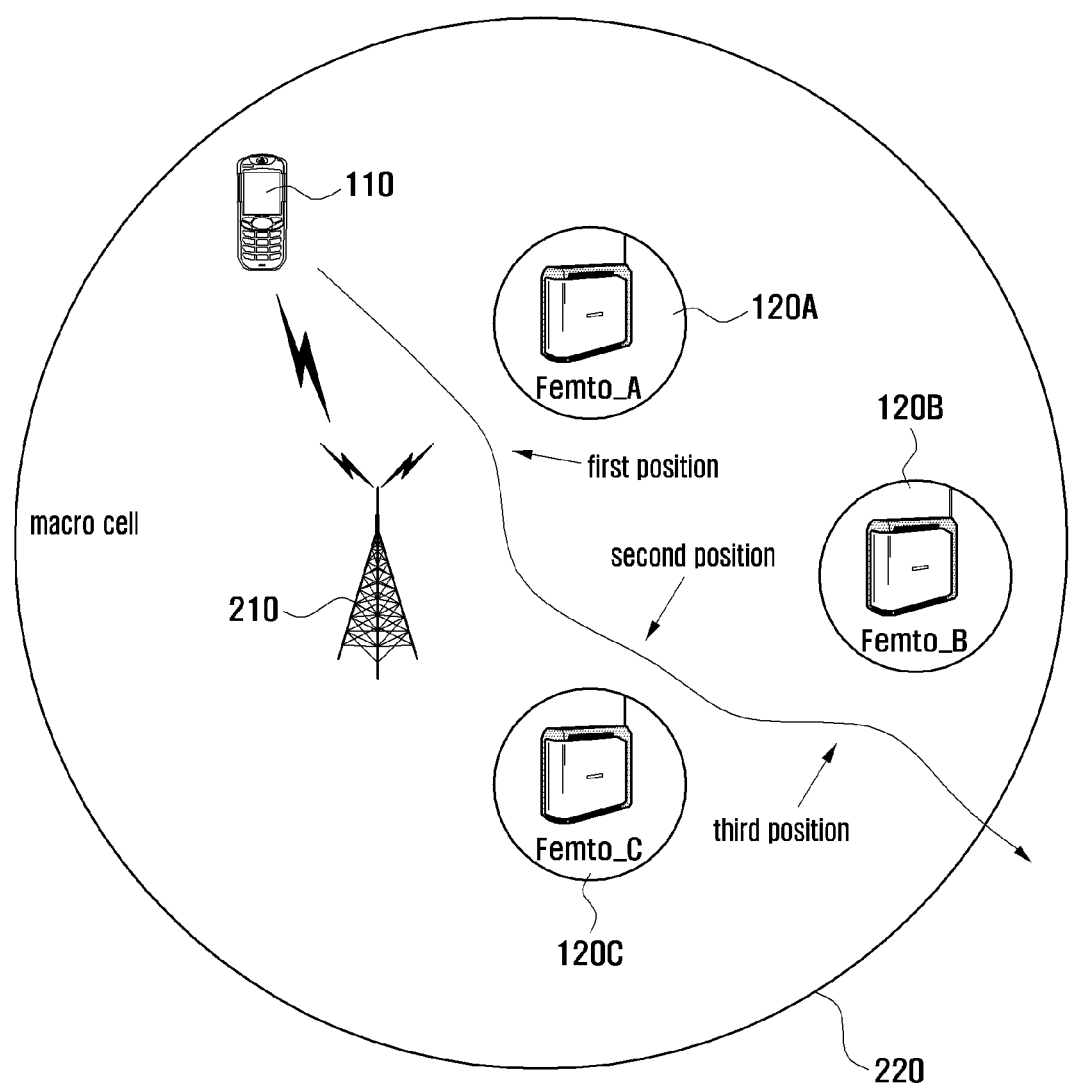
FIG. 2 is a diagram illustrating interference problem occurring in forward or reverse channels of macro base station and femto base station in the conventional femto cell system.

FIG. 2 is a diagram illustrating a situation incurring interference on the forward or reverse channel between the macro base station 210 and the femto cell base station 120 in the conventional mobile communication system.

First of all, it is assumed that the macro base station 210 and a plurality of femto cell base stations 120A, 120B, and 120C are located within the coverage of the macro cell 220. Simultaneously, it is assumed that the terminal 110 communicating with the macro base station 210 moves along the line connecting the first to third positions to pass by the femto cell base stations.

In case that the terminal 110 communicates with the macro base station 210 at a location out of the coverage of the femto cell base stations 120A, 120B, and 120C, no interference occurs between the macro base station 210 and the femto cell base stations 120A, 120B, and 120C.

However, when passing the first position, the terminal 110 is located near the communication radius of the femto cell base station 120A so as to be likely to experience interference to the communication with the macro base station 210. Also, when passing the second position, the terminal 110 is located near the communication radius of the femto cell base station 120B so as to be likely to experience interference to the communication with the macro base station 210, and similarly, when passing the third position, located near the communication radius of the femto cell base station 120C to experience interference to the communication with the macro base station 210.

Although the description is directed to the interference problem to the terminal 110 communicating with the macro base station 210 moves, this can be applied to the terminal communicating with a femto cell base station.

In order to solve this problem, the present invention divides the forward or reverse radio resource shared by the macro base station 210 and the femto cell base station 120 into groups in unit of segmentation unit and assigns priority to a specific base station for use of maximum transmission power in group.

Figure 3A:
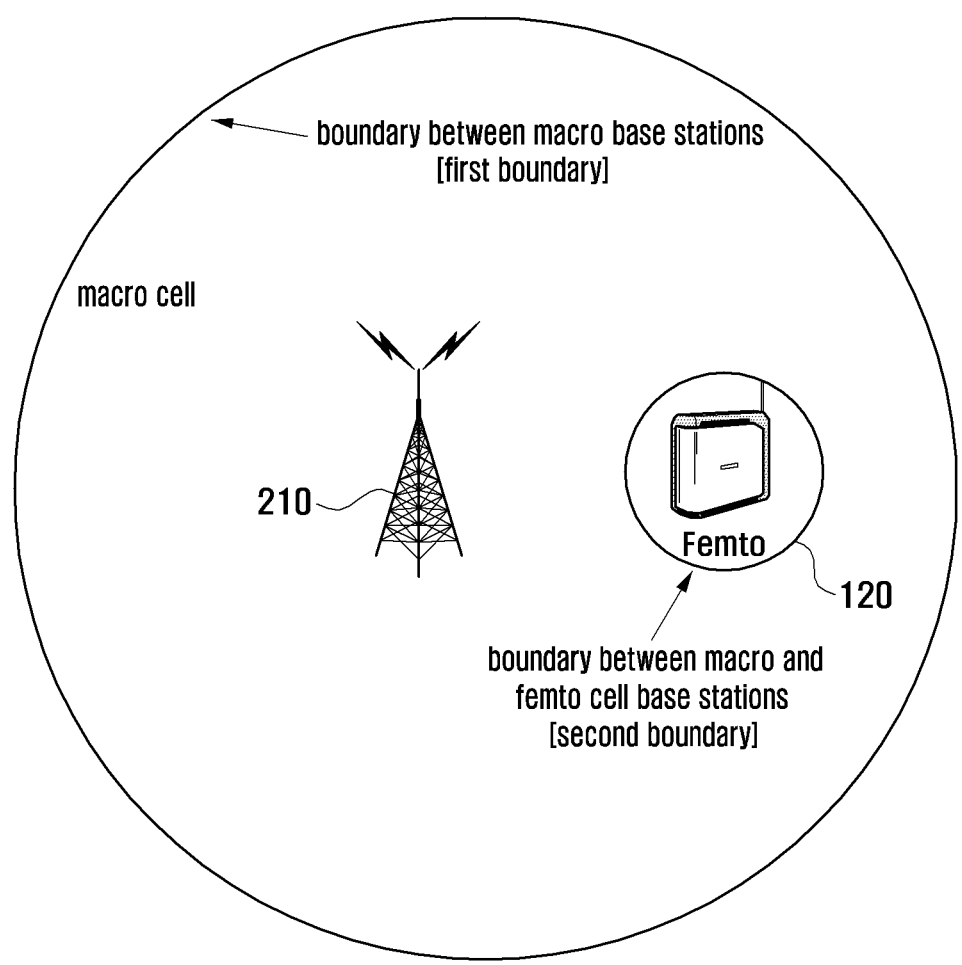
FIG. 3 is a diagram illustrating variation of the service coverage by dividing the radio resource shared by the macro base station 210 and the femto cell base station 120 into groups and assigning priority for use of maximum transmit power.
Figure 3B:
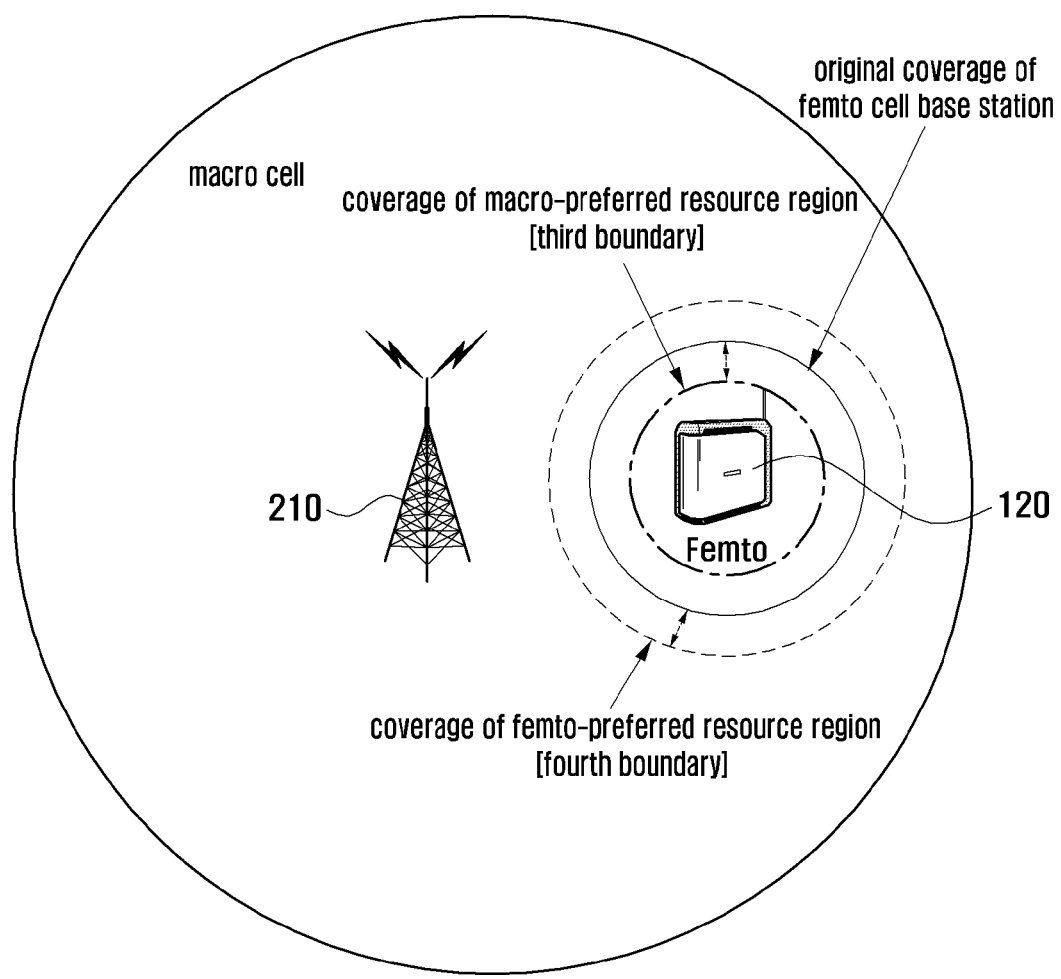

FIG. 3 is a diagram illustrating variation of the service coverage by dividing the radio resource shared by the macro base station 210 and the femto cell base station 120 into groups and assigning priority for use of maximum transmit power.

Part [a] of FIG. 3 shows the service coverage of the macro base station 210 and the femto cell base station 120 when not priority is assigned to the radio resource. In part [a] of FIG. 3, the service coverage boundary between the macro base stations is referred to as the first boundary and the service coverage boundary between the macro base station 210 and the femto base station 120 is referred to as the second boundary.

In this case, if the terminal 100 approaches the second boundary formed between the macro base station 210 and the femto cell base station 120, the interference occurs on the radio resource shared by them. Accordingly, the present invention proposes a method for dividing the radio resource shared by the macro base station 210 and the femto cell base station 120 into groups and assigning the maximum transmit power usage priority of one group to the macro base station 210 and the maximum transmit power usage priority of the other group to the femto cell base station 120.

According to the proposed method, the service coverages of the macro base station 210 and the femto cell base station 120 are changed as shown in part [b] of FIG. 3.

The macro base station 210 and the femto cell base station 120 can transmit data to the terminal 100 at the maximum transmit power on the radio resource groups to which they are assigned priorities, respectively. Similarly, the terminal 110 can transmit data to the macro base station 210 and the femto cell base station on the respective radio resource groups at the maximum transmit powers, respectively.

Meanwhile, the macro base station 210 and the femto base station 120 can use the limited transmit power in the radio resource groups for which no maximum transmit power usage priority is assigned. Similarly, the user terminal can use only the limited transmit power in the radio resource groups for which no maximum transmit power usage priority is assigned to the corresponding macro base station 210 and the femto cell base station 120. Here, if the user can use the limited transmit power, this mean using the power corresponding to a specific value below the predetermined maximum transmit power or the power corresponding to a specific percentage of the maximum transmit power.

The above operations are described in association with part [b] of FIG. 3. In the radio resource group for which the macro base station 210 has priority, the macro base station 210 and the terminal 110 connected to the macro base station 210 can us the maximum transmit power. Accordingly, the service coverage of the macro base station 210 is expanded from the previous second boundary to the third boundary. Oppositely, in the radio resource group for which the macro base station has the priority, the service coverage of the femto cell base station shrinks from the second boundary to the third boundary.

Meanwhile, in the radio resource group for which the femto cell base station has the priority, the femto cell base station 120 and the terminal 110 connected to the femto cell base station 120 can use the maximum transmit power. Accordingly, the service coverage of the femto cell base station expanded from the second boundary to the fourth boundary. Oppositely, in the radio resource group for which the femto cell base station 120 has the priority, the service coverage of the macro base station decreases from the second boundary to the fourth boundary.

Figure 4:
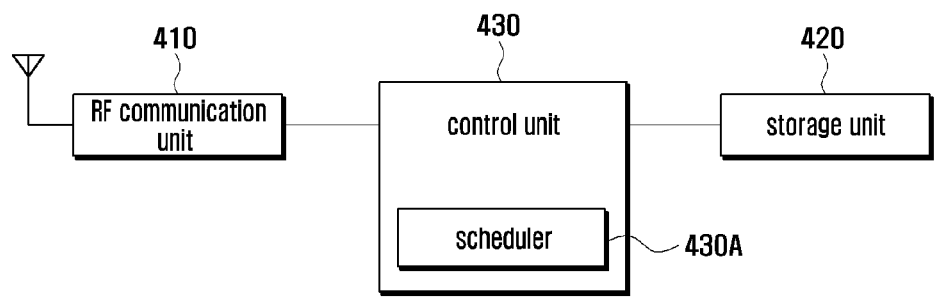
FIG. 4 is a block diagram illustrating a configuration of the base station according to an embodiment of the present invention.

FIG. 4 is a block diagram illustrating a configuration of the base station according to an embodiment of the present invention. Here, the block diagram can be applied to both the macro base station 210 and femto cell base station 120. The base station can include an RF communication unit 410, a storage unit 420, and a control unit 430 having a scheduler 430A.

The RF communication unit 410 includes an RF transceiver and a duplexer and is responsible for the typical base station function such as RF transmission/reception process. The RF communication unit 410 transmits the data signal selected under the control of the control unit 430 to the terminal 110. The storage unit 420 can stores programs and data necessary for the overall operations of the base station according to an embodiment of the present invention. Particularly, the storage unit 420 can store the data received from a higher network node per terminal or service.

The control unit 430 controls the overall operations of the base station according to an embodiment of the present invention. In this case, the control unit 430 can assign the radio resources to the respective base station so as to use the maximum transmit power in different resource regions. The control unit 430 also can assign the radio resource such that the terminal 110 can use the maximum transmit power in the resource region for which a certain base station has the usage priority.

Particularly, the control unit 430 according to an embodiment of the present invention can include a scheduler 430A. The scheduler 430A controls the data stored in the storage unit 420 selectively in consideration of the resource division information proposed in the present invention, transmit power information per resource, forward channel status information transmitted by the terminal 110, service characteristic, and fairness. That is, the scheduler 430 can control the RF communication unit 410 to transmit the data to the terminal 110 at the maximum transmit power in the radio resource group for which the base station has the usage priority. In more detail, the scheduler 430A according to an embodiment of the present invention divides the radio resource shared by macro base station and the femto cell base station into groups according to a predetermined rule. Next, the scheduler 430A can perform scheduling by allocating the radio resource groups such that the terminal 110 uses the maximum transmit power in the respective resource groups for plural base stations.

Figure 5:
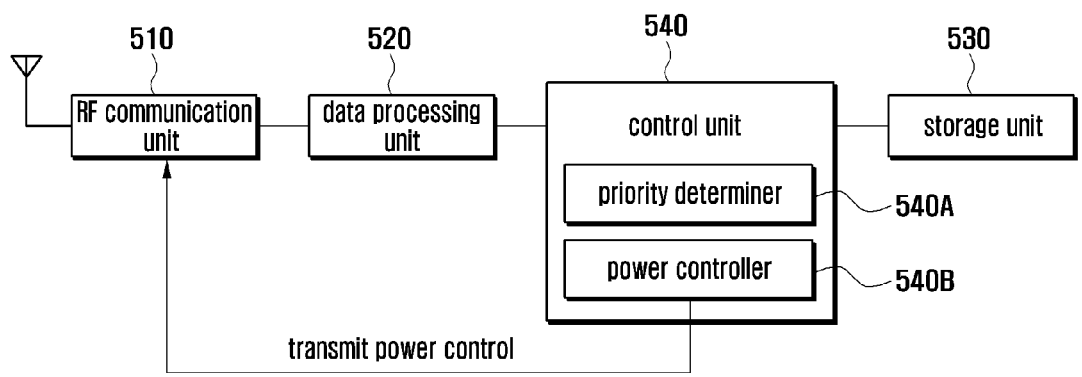
FIG. 5 is a block diagram illustrating a configuration of the terminal 110 according to an embodiment of the present invention.

FIG. 5 is a block diagram illustrating a configuration of the terminal 110 according to an embodiment of the present invention. The terminal 110 can include an RF communication unit 510, a data processing unit 520, a storage unit 530, and a control unit 540. The control unit 540 can include a priority determiner 540A and a power controller 540B.

The RF communication unit 510 includes an RF transceiver and a duplexer and is responsible for performing the general functions of the terminal 110 such as RF transmission/reception process. Particularly, the RF communication unit 510 adjusts the transmit power level to transmit the radio resource to the base station (macro base station or femto cell base station) under the control of the power controller 550B.

The data processing unit 520 can include a transmit data processor and a receive data processor (not shown). The transmit data processor can include a coder for encoding transmission signal, a modulator for modulating the coded signal, and a digital-analog converter for converting the modulated signal to an analog signal. Here, the coder can include a data coder for processing packet data and an audio coder for processing audio signal including voice.

The receive data processor can include an analog-digital converter for converting the analog signal output by the RF communication unit 510 to a digital signal, a demodulator for demodulating the modulated signal, and a decoder for decoding the modulated signal. Here, the decoder can includes a data decoder for processing packet data and an audio decoder for processing audio signal including voice.

The storage unit 530 can store the programs and data necessary for the operations of the terminal 110 according to an embodiment of the present invention.

The control unit 540 controls the overall operations of the terminal 110 according to an embodiment of the present invention. Particularly, the control unit 540 can includes a priority determiner 540A and a power controller 540B.

The priority determiner 540A determines the radio resource group corresponding to the radio resource based on the number of the subframe as the time unit of reverse radio resource. Here, the segmentation unit for dividing the radio resource can be interlace or order pair of interlace and multiplex (interlace and multiplex are described later). The priority determiner 540A determines whether the determined radio resource group is the group assigned the priority to use the maximum transmit power for the base station communicating with the terminal 110.

The power controller 540B controls such that the transmit power of the RF communication 510 is set to maximum value for the radio resource group assigned the priority according to the determination result of the priority determiner 540A. Meanwhile, the power controller 540B controls such that the transmit power of the RF communication unit 510 is set to a value in a restricted range for the radio resource group to which priority is not assigned.

The power control methods according to the first and second embodiments of the present invention are described hereinafter. Although the description is directed to the case of the power control method of the terminal for reverse radio resource, the present invention can be applied to the power control of the base station for forward radio resource in the same principle.

First Embodiment

The first embodiment relates to a method for dividing the reverse radio resource shared by the base stations (i.e., macro and femto cell base stations) in unit of interlace and assigning priority to a specific base station for use of a radio resource group in the interlace. That is, according to the first embodiment of the present invention, the unit of the dividing the radio resource into groups is interlace.

In HRPD system, the reverse radio resource is divided into subframes in time domain. One or more terminals 110 transmit data to the macro base station 210 or the femto cell base station 220 which is in communication with. The description is made under the assumption that the radio resource is subframe.

In HRPD system, the terminal 110 can retransmit the physical layer packet transmitted previously at an interval of four subframes. According to the interval at which synchronized HARQ occurs, the subframes as the radio resource are discriminated as 4 radio resource groups. Here, the radio resource groups generated by dividing the radio resource in a retransmission period can be referred to as interlaces.

In more detail, assuming the subframes numbered 0, 1, 2, 3, 4, 5, 6, . . . , n in the HARQ system, the $0^{th}$ subframe constitutes the first radio resource group (interlace 0) along with the $4^{th}$, $8^{th}$, . . . , $(4n)^{th}$ subframes in which its retransmission occurs. Likewise, the $1^{st}$, $5^{th}$, $9^{th}$, . . . , $(4n+1)^{th}$ subframes constitute the second resource group (interlace 1), the $2^{nd}$, $6^{th}$, $10^{th}$, . . . , $(4+2)^{th}$ subframes constitute the third resource group (interlace 2), and the $3^{rd}$, $7^{th}$, $11^{th}$, and $(4n+3)^{th}$ subframes constitute the fourth resource group (interlace 3).

Figure 6A:
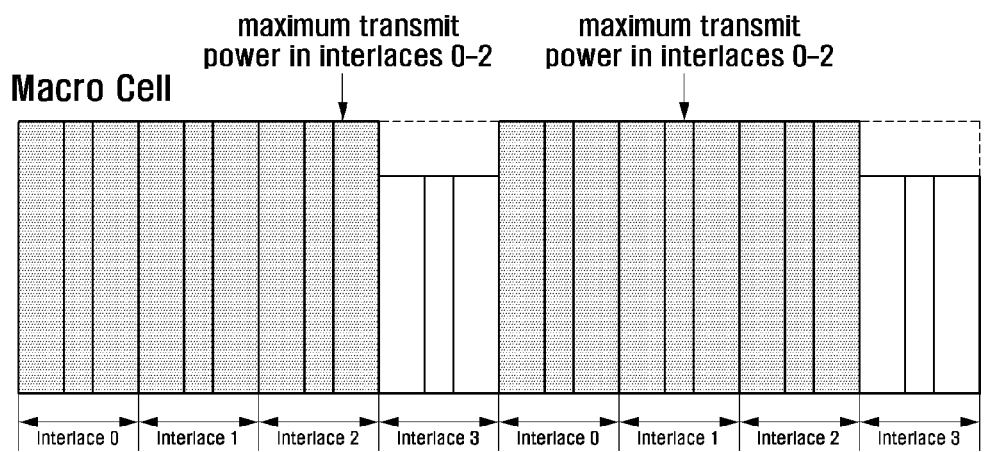
FIG. 6 is a diagram illustrating a method for dividing the reverse radio resource into groups in unit of interlace and assigning priority to a base station for use of the resource groups.
Figure 6B:
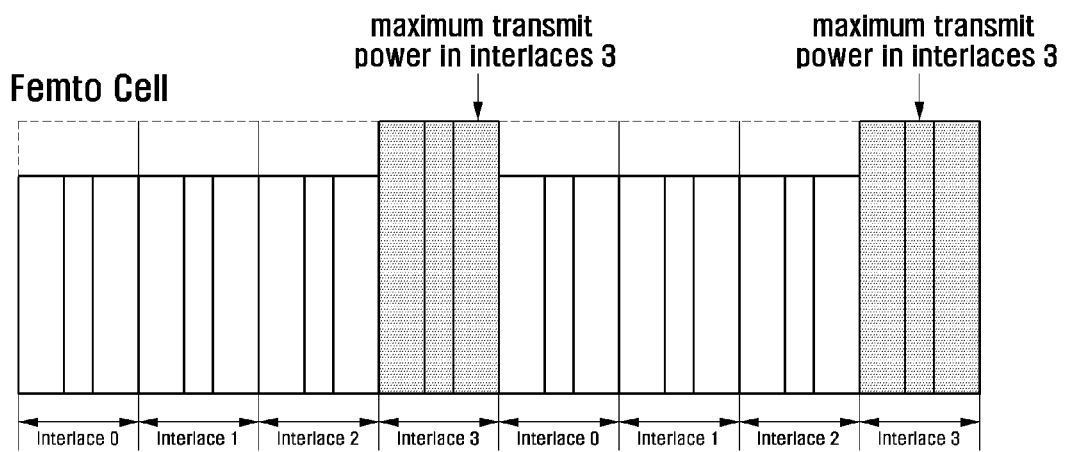

FIG. 6 is a diagram illustrating a method for dividing the reverse radio resource into groups in unit of interlace and assigning priority to a base station for use of the resource groups.

First of all, part [a] of FIG. 6 shows the resource allocation state in which the macro base station 210 is assigned the priority for use of the radio resource groups corresponding to the interlaces 0 to 2 in the reverse radio resource shared by the macro base station 210 and the femto cell base station 120.

According to part [a] of FIG. 6, when assigning the reverse resource to the terminal 110 in communication with the macro base station 210, the macro base station 210 can configure such that the terminal 110 can use the maximum transmit power for the radio resource groups corresponding to the interlaces 0 to 2. Meanwhile, the macro base station 210 can configure such that the terminal 110 can use the restricted transmit power for the radio resource group corresponding to the interlace 3.

Part [b] of FIG. 6 shows the resource allocation state in which the femto cell base station 120 is assigned the priority for use of the radio resource group corresponding to the interlace 3.

According to [b] of FIG. 6, when assigning the reverse resource to the terminal 110 in communication with the femto cell base station 210, the femto cell base station 120 can configure such that the terminal 110 can use the maximum transmit power for the radio resource group corresponding to the interlace 3. Meanwhile, the femto cell base station 120 can configure such that the terminal 100 can use the restricted transmit power for the radio resource groups corresponding to the interlaces 0 to 2.

As shown in parts [a] and [b] of FIG. 6, the macro base station 210 secures the service coverage expanded as compared to the conventional system coverage in the radio resource groups corresponding to the interlaces 0 to 2. Accordingly, the terminal 110 in communication with the macro base station 210 can maintain the communication with the macro base station 210 stably in the resource region of the radio resource groups corresponding to the interlaces 0 to 2 even inside of the coverage boundary of the femto cell base station 120.

Likewise, the femto cell base station 120 secures the service coverage expanded as compared to the conventional system coverage in the radio resource group corresponding to the interlace 3. Accordingly, the terminal 110 in communication with the femto cell base station 120 can maintain the communication with the femto cell base station 120 stably in the resource region of the radio resource group corresponding to the interlace 3 even inside of the coverage boundary of the macro base station 210.

A description is made of the method for notifying the terminal 110 of the radio resource allocation information with base station-specific priorities hereinafter. First of all, when the terminal 110 is assigned physical layer resource from a specific base station or adds the specific base station to its Active Set, the resource allocation information can be transferred to the terminal 110 in the form of a message (hereinafter, 'resource allocation message'). Also, the base station can transmit the radio resource allocation information to the terminal by means of the Configuration Attribute used when negotiating the data transmission scheme with the terminal.

Figure 7:
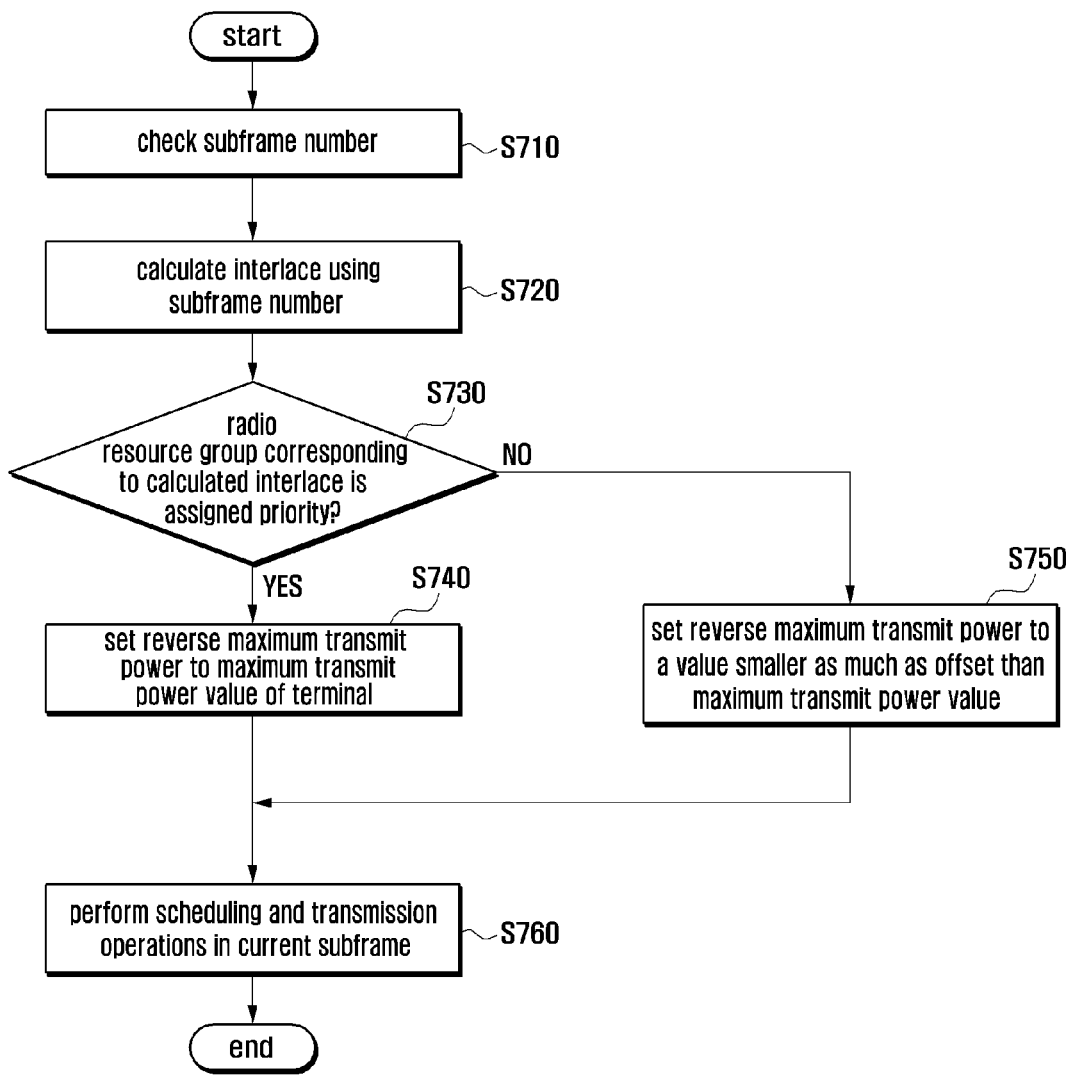
FIG. 7 is a flowchart illustrating a power control procedure of the terminal 110 according to the first embodiment of the present invention.

FIG. 7 is a flowchart illustrating a power control procedure of the terminal 110 according to the first embodiment of the present invention.

First of all, the terminal 110 checks the sequence number of the reverse radio resource (i.e., subframe number) for transmission to the macro base station 210 of the femto base station 20 at step S710. Next, the terminal 110 calculates the interlace for determining the radio resource group of the subframe at step S720.

In this case, the terminal 110 calculates the interlace (i) using the value obtained by dividing the reverse subframe number (n) by the total number of interlaces (t). In an exemplary case that the total number of the interlaces per subframe is 4 (t=4) and the current subframe number is 7 (n=7), the interlace (i) is 3 (n/t).

The terminal 110 determines whether the radio resource corresponding to the calculated interlace belongs to the resource group for which the base station in communication with the terminal 110 is assigned the priority of maximum transmit power use.

In this case, the terminal 110 can check the radio resource group for which the base station in communication with the terminal 110 is assigned the priority of maximum transmit power usage by referencing the resource allocation message received from the base station as described above. Here, the resource allocation message can include the information on the resources that are allocated to the macro and femto cell base stations with maximum transmit power.

According to another embodiment of the present invention, the terminal 110 can check the radio resource group for which the base station in communication with the terminal 110 is assigned the maximum transmission power use priority based on the Configuration Attribute used in data transmission scheme negotiation with the base station.

If the priority is assigned, the terminal 110 sets the transmit power of the reverse subframe to the maximum transmit power at step S740. Next, the terminal 110 performs scheduling and data transmission in the current subframe using the maximum transmit power at step S760.

Otherwise, if the priority is not assigned, the terminal 110 sets the transmit power of the reverse subframe to a restricted transmit power at step S750. Here, the restricted transmit power can be a value equal to a specific percentage of the maximum transmit power or a value obtained by subtracting a predetermined offset value from the maximum transmit power. The terminal performs scheduling and data transmission operation in the current subframe using the transmit power value at step S760.

Second Embodiment

The second embodiment relates to a method for dividing the reverse radio resource shared by base stations into groups in unit of interlace and then regrouping the resource into multiplexes to control power. According to the second embodiment of the present invention, the division unit for grouping the radio resource is a ordered pair consisted of the interlace and multiplex.

Figure 8A:
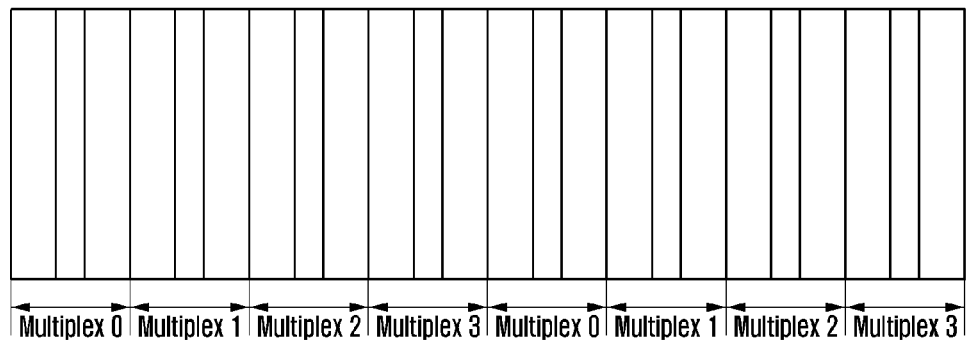
FIG. 8 is a diagram illustrating a procedure for grouping the reverse radio resources into ordered pairs of multiplexes.
Figure 8B:
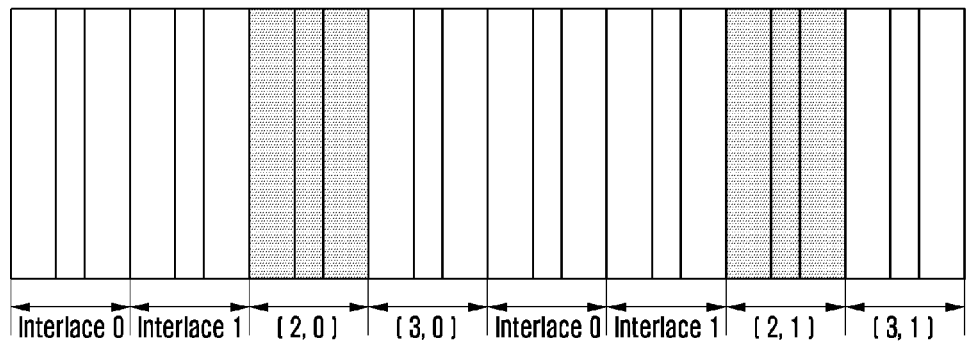
Figure 8B:
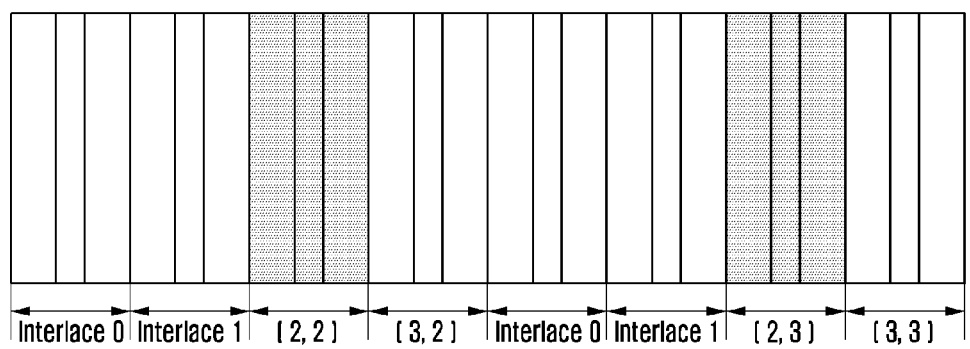
Figure 9A:
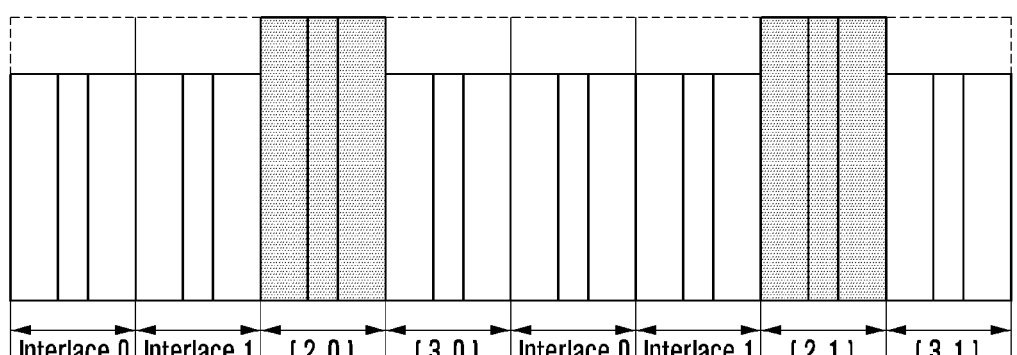
FIG. 9 is a diagram illustrating a resource allocation state in which the reverse radio resource is divided into ordered multiplex pairs and assigned to a specific base station with priority.
Figure 9A:
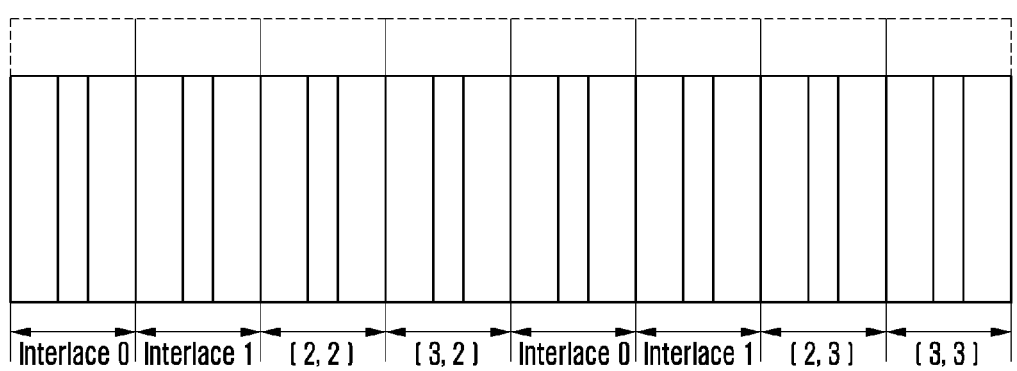
Figure 9B:
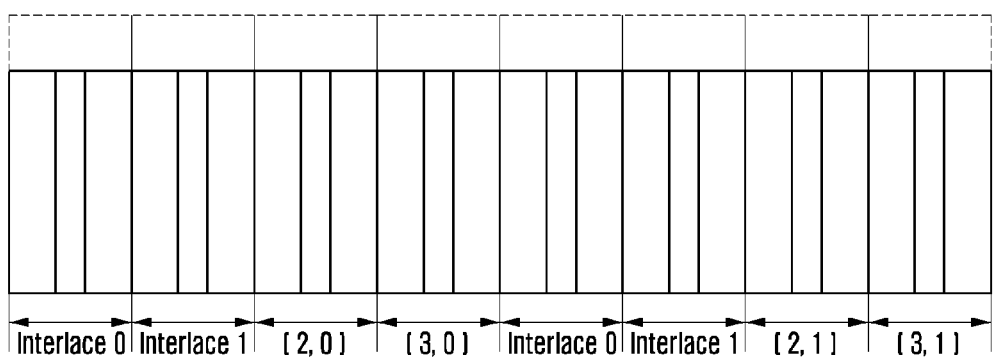
Figure 9B:
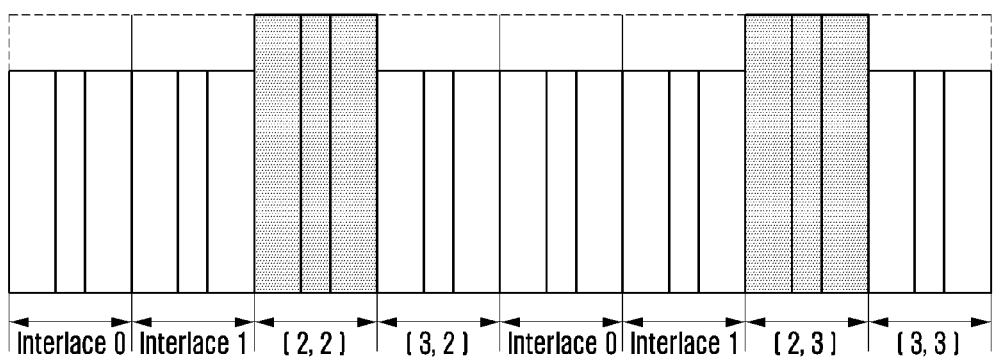

FIG. 8 is a diagram illustrating a procedure for grouping the reverse radio resources into ordered pairs of multiplexes.

In part [a] of FIG. 8, a specific interlace, i.e. interlace 2 is depicted, among a plurality of interlaces (interlaces 0 to 3). The interlace 2 depicted in part [a] of FIG. 8 is divided into a plurality of multiplexes in time domain. According to an embodiment of the present invention, the interlace is divided into 4 multiplexes (multiplexes 0 to 3).

In part [b] of FIG. 8, the ordered pair of multiplexes in the interlace divided into multiplexes. As shown in part [b] of FIG. 8, when the interlace 2 is divided into 4 multiplexes, the ordered multiplex pairs can be composed of the first radio resource group (ordered multiplex pair (2,0)), the second radio resource group (ordered multiplex pair (2,1)), the third radio resource group (ordered multiplex pair (2,2), and the fourth radio resource group (ordered multiplex pair (2,3). In the second embodiment of the present invention, the radio resource is divided into groups in unit of ordered multiplex pair, and a specific base station is assign the priority for the radio resource group of the ordered multiplex pair.

FIG. 9 is a diagram illustrating a resource allocation state in which the reverse radio resource is divided into ordered multiplex pairs and assigned to a specific base station with priority.

First of all, part [a] of FIG. 9 shows a state in which the radio resource group corresponding to the ordered multiplex pairs (2,0) and (2,1) is assigned to the femto cell base station A 120A with priority.

In case of assigning reverse resource to the terminal 110 in communication with the femto cell base station A 120A, the femto cell base station A 120A configures such that the terminal 110 uses the maximum transmit power for the ordered multiplex pair. However, the femto cell base station A 120A configures such that the terminal 110 uses a restricted transmit power for the reset resource.

Part [b] of FIG. 9 shows a state in which the radio resource group corresponding to specific multiplex pairs (2,2) and (2,3) are assigned to the femto base station B 120B with priority.

In case of assigning reverse resource to the terminal 110 in communication with the femto cell base station B 120B, the femto cell base station B 120B configures such that the terminal 110 uses the maximum transmit power for the ordered multiplex pairs. However, the femto call base station B 120B configures such that the terminal 110 uses a restricted transmit power for the rest resource.

Although the description is directed to the case where the ordered multiplex pairs are assigned to the femto base station A 120A and the femto base station B 120B, it is not limited thereto. That is, certain radio resource groups can be assigned to a macro base station and other femto base stations other than the femto cell base stations A and B.

Figure 10:
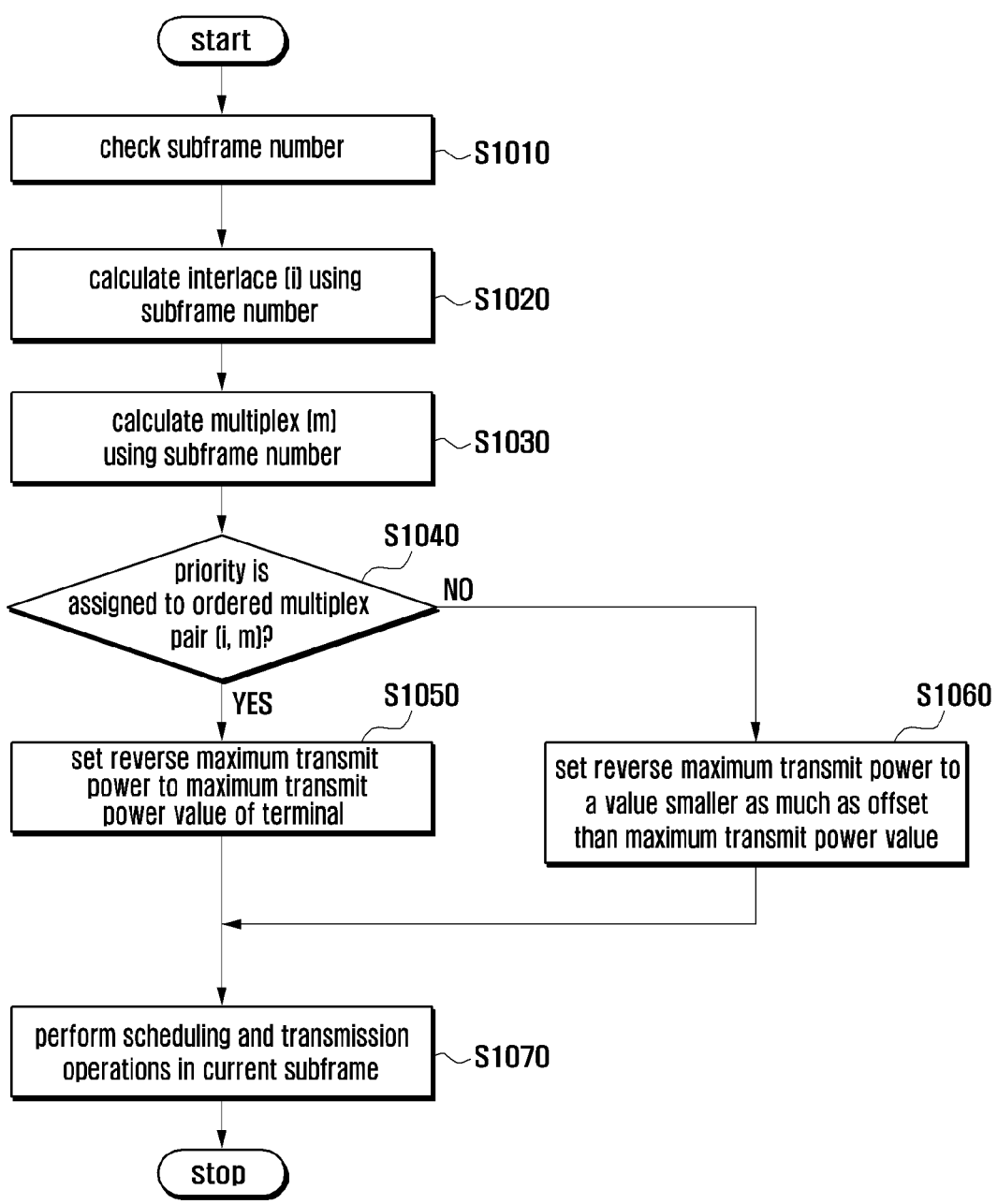
FIG. 10 is a flowchart illustrating a power control procedure of the terminal 110 according to the second embodiment of the present invention.

FIG. 10 is a flowchart illustrating a power control procedure of the terminal 110 according to the second embodiment of the present invention.

First of all, the terminal 110 checks the sequence number of the current reverse radio resource, i.e. the subframe number, for the transmission to the macro base station 210 or femto cell base station 120 in communication with at step S1010. Next, the terminal 110 calculates the interlace and multiplex for determining the radio resource group in the subframe at steps S1020 and S1030.

In detail, the terminal 110 calculates the interlace (i) using the value obtained by dividing the reverse subframe number (n) by the total number of interlaces (t1) at step S1020. Next, the terminal 110 floors the value obtained by dividing the reverse subframe number (n) by the total number of interlaces (t1) and then calculates the multiplex (m) using the remainder of the value obtained by dividing the result by the total number of multiplexes (t2). In this manner, the terminal 110 can acquire the ordered multiplex pair (i, m).

Next, the terminal 110 determines the radio resource group using the ordered multiplex pair calculated as above and judges whether the determined radio resource group is the group assigned to the base station in the current communication with the priority at step S1040. As described above, the terminal 110 can identify the ordered multiplex pair for which the base station in communication with the terminal is assigned the priority by means of the resource allocation message or Configuration Attribute received from the base station.

If the priority is assigned, the terminal 110 set the transmit power of the reverse subframe to the maximum transmit power at step S1050. Next, the terminal 110 performs scheduling and data transmission in the current subframe using the maximum transmission power value at step S1070.

Otherwise, if the priority is not assigned, the terminal 110 sets the transmit power of the reverse subframe to a restricted transmit power at step S1060. Herein, the restricted transmit power can be a value equal to a specific percentage of the maximum transmit power or a value obtained by subtracting a predetermined offset value from the maximum transmit power. Next, the terminal 110 performs scheduling and data transmission operation in the current subframe using the transmit power value at step S1070.

The specification and drawings are to be regarded in an illustrative rather than a restrictive sense in order to help understand the present invention. It is obvious to those skilled in the art that various modifications and changes can be made thereto without departing from the broader spirit and scope of the invention.

What is claimed is:

1. A method for controlling a transmit power by a base station, the method comprising:
    grouping a plurality of sub frames shared by macro and femto base stations into a plurality of interlace groups, each interlace group including at least one sub frame;
    re-grouping the plurality of interlace groups into a plurality of multiplex groups, each multiplex group including at least one interlace group;
    allocating radio resources to a first terminal connected to the base station to use maximum transmit power in at least one first multiplex group;
    allocating the radio resources to a second terminal connected to another base station to use maximum transmit power in at least one second multiplex group; and
    transmitting allocated radio resource information on the at least one first multiplex group to the first terminal and transmitting the allocated radio resource information on the at least one second multiplex group to the second terminal,
    wherein the grouping comprises grouping the plurality of sub frames into the plurality of interlace groups according to a retransmission cycle of a sub frame from the terminal to the base station.

2. The method of claim 1, wherein the transmitting comprises sending a resource allocation message including the allocated radio resource information.

3. The method of claim 1, wherein the transmitting comprises sending the allocated radio resource information by means of a Configuration Attribute.

4. A method for controlling transmit power by a terminal, the method comprising:
    receiving information on radio resources allocated to use with maximum transmit power from one of macro and femto base stations;
    transmitting data using the maximum transmit power to a base station in communication with the terminal in at least one multiplex group configured to use the maximum transmit power; and
    transmitting the data using a transmit power below the maximum transmit power to the base station in communication with the terminal in at least one multiplex group excepted for the at least one multiplex group configured to use the maximum transmit power,
    wherein a plurality of sub frames shared by the macro and femto base stations are grouped into a plurality of interlace groups, each interlace group including at least one sub frame,
    wherein the plurality of interlace groups are re-grouped into a plurality of multiplex groups, each multiplex group including at least one interlace group, and
    wherein the plurality of sub frames are grouped into the plurality of interlace groups according to a retransmission cycle of a sub frame from the terminal to a base station.

5. The method of claim 4, wherein the receiving of the information on radio resource comprises receiving a resource allocation message including the radio resource information.

6. The method of claim 4, wherein the receiving of the information on the radio resource comprises receiving a Configuration Attribute including the radio resource information.

7. A base station for controlling transmit power, the base station comprising:
    a scheduler which performs scheduling by grouping a plurality of sub frames shared by macro and femto base stations into a plurality of interlace groups, each interlace group including at least one sub frame, re-grouping the plurality of interlace groups into a plurality of multiplex groups, each multiplex group including at least one interlace group, allocating radio resources to a first terminal connected to the base station to use maximum transmit power in at least one first multiplex group, and allocating the radio resources to a second terminal connected to another base station to use maximum transmit power in at least one second multiplex group; and
    a radio communication unit which transmits allocated radio resource information on the at least one first multiplex group to the first terminal and transmits the allocated radio resource information on the at least one second multiplex group to the second terminal,
    wherein the scheduler groups the at least one sub frame into the plurality of interlace groups according to a retransmission cycle of a sub frame from the terminal to the base station.

8. The base station of claim 7, wherein the scheduler generates a resource allocation message including the allocated radio resource information and transmits the resource allocation message to the terminal.

9. The base station of claim 7, wherein the scheduler transmits the allocated radio resource information by means of Configuration Attribute.

* * * * *